March 29, 1938. G. K. PARSONS 2,112,469
CONTROLLING MEANS FOR WASHING MACHINES
Filed April 12, 1937    2 Sheets-Sheet 1

FIG.I.

INVENTOR.
GEORGE K. PARSONS
BY
ATTORNEYS

March 29, 1938.  G. K. PARSONS  2,112,469
CONTROLLING MEANS FOR WASHING MACHINES
Filed April 12, 1937  2 Sheets-Sheet 2
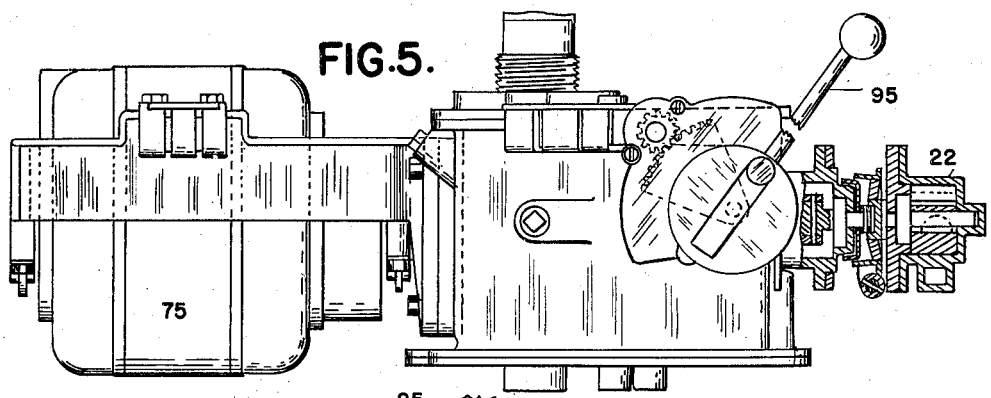
FIG.5.
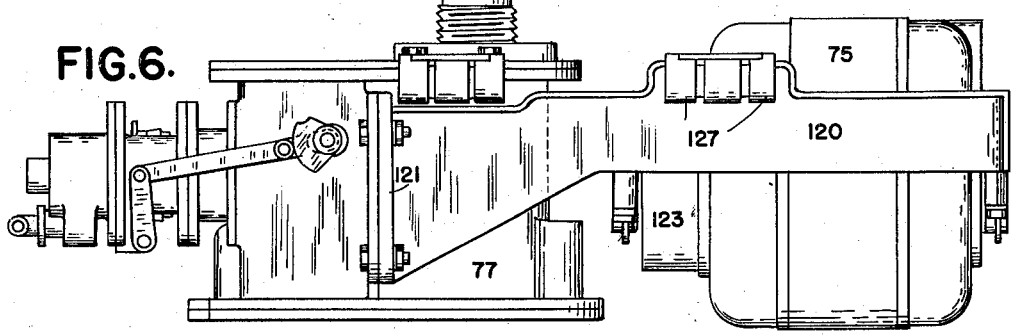
FIG.6.
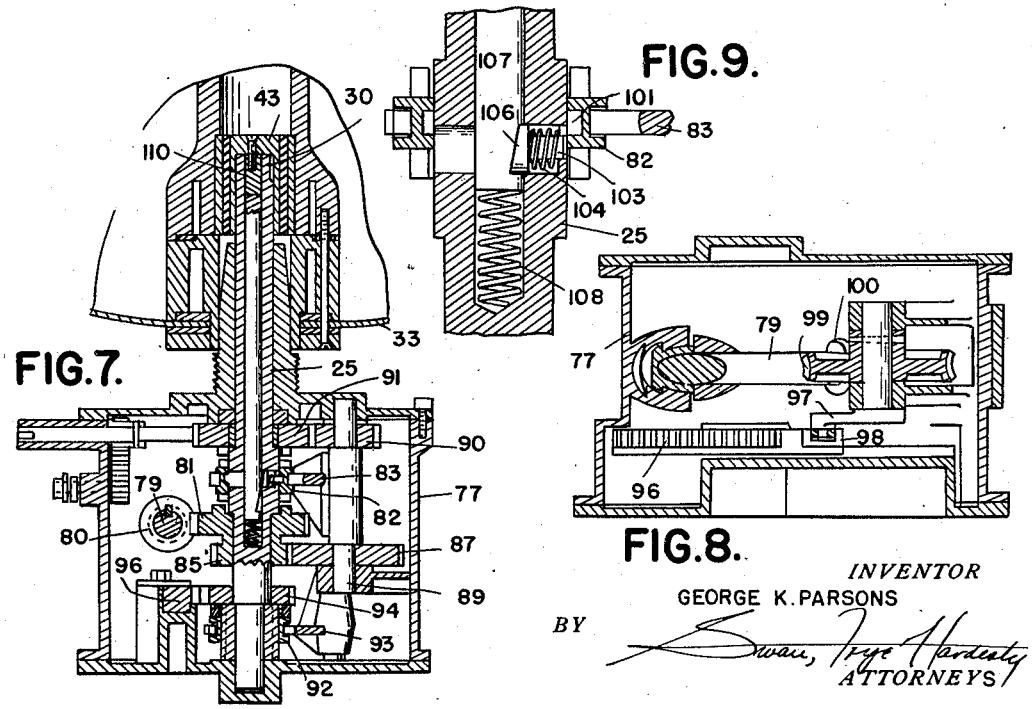
FIG.7.  FIG.8.
FIG.9.
INVENTOR
GEORGE K. PARSONS
BY
ATTORNEYS Patented Mar. 29, 1938

2,112,469

UNITED STATES PATENT OFFICE 2,112,469

CONTROLLING MEANS FOR WASHING MACHINES

George K. Parsons, Detroit, Mich., assignor to Unitor Corporation, Detroit, Mich., a corporation of Michigan Application April 12, 1937, Serial No. 136,330

7 Claims. (Cl. 74—16)

This invention relates to power supplying and controlling mechanisms, particularly for convertible household machines adapted to perform dish and/or clothes washing and various other household operations. In such machines as that shown in my previously issued Patent No. 2,076,-587, granted April 13, 1937, it is frequently required that a main power shaft to which various accessories are attachable be operable at various speeds and in different manners. For example it may be necessary to rotate the shaft at different speeds, and to oscillate it. The invention also concerns the mounting of such power supplying and controlling mechanisms.

An important object of the invention is to provide an improved transmission mechanism for such convertible household devices, incorporating manually regulable means whereby its torque converting characteristics may be changed, and incorporating as well an automatic over-control, responsive to the application or the attempted application of various accessory devices to the driven shaft, and functioning to prevent shifting the transmission to undesirable speeds when the accessory devices should not be operated at such speeds, or would impose undue strains upon the mechanism.

A further object is to provide such an automatic over-control mechanism which prevents the attachment to the driven shaft of an accessory which should not be driven at the speed then dictated by the transmission, making it necessary to shift the transmission control lever to the proper position before the accessory in question can be attached.

Still another object is the provision of such a transmission wherein the aforementioned and other objects are achieved, and the various speeds and drives are attained by structural means of very simple, rugged and inexpensive character.

A further object is the provision of such power supplying and controlling means which is mounted in a unique manner, greatly reducing the possible noise conduction between the operating mechanism and the frame, tub or other parts of the machine which might serve as resonators.

In the drawings:

Figure 1 is a side view of a machine incorporating power controlling and transmitting mechanism arranged in accordance with the present invention, partly broken away to show the method of suspending the transmission and driving motor assembly.

Figure 5 is a side view of such motor and transmission assembly, showing the pumping means broken away in central longitudinal section.

Figure 6 is an elevational view of the opposite side of the assembly.

Figure 3:
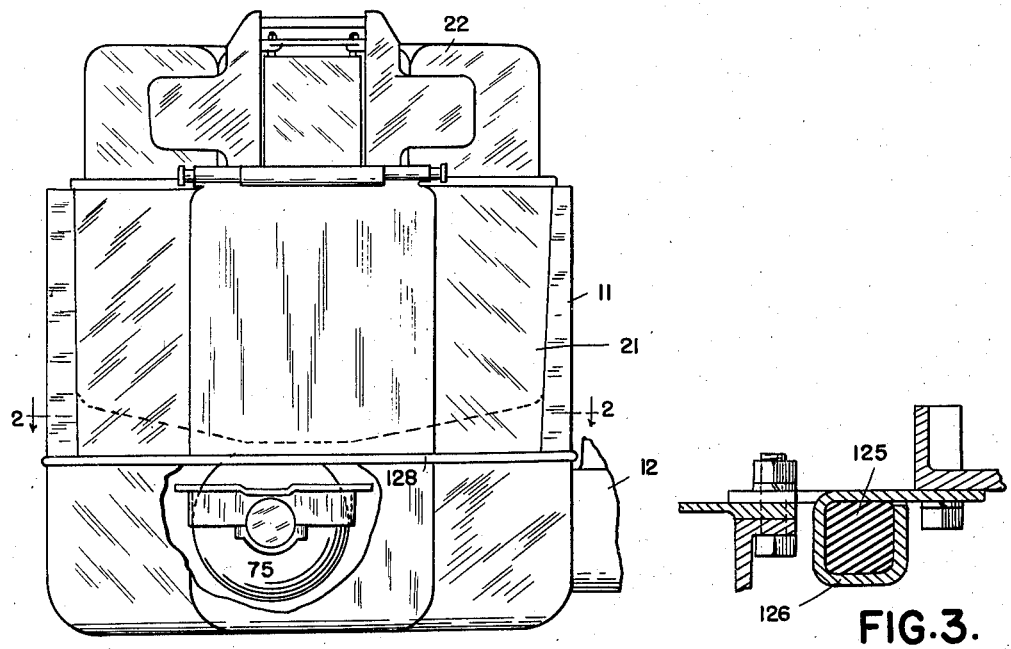
Figure 3 is a detailed section taken substantially on the line 3—3 of Figure 2 and looking in the direction of the arrows.
Figure 2:
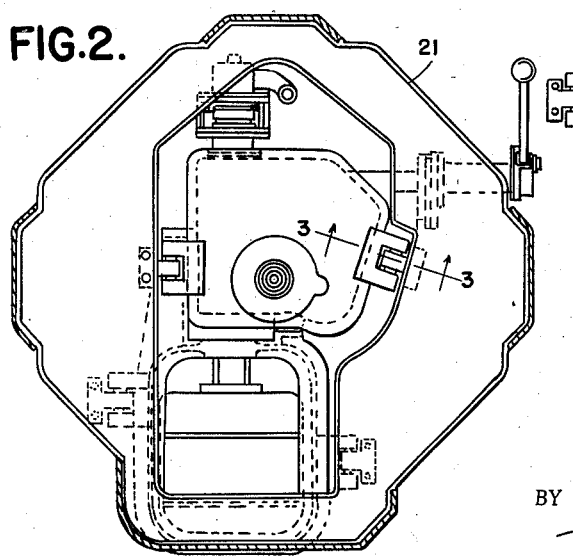
Figure 2 is a horizontal section taken substantially on the line 2—2 of Figure 1 and looking in the direction of the arrows.
Figure 4:
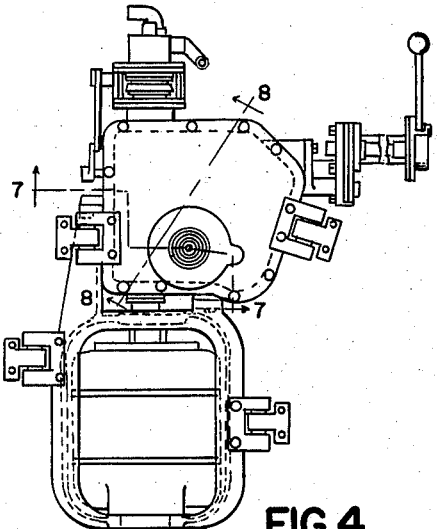
Figure 4 is a plan view of the motor and transmission assembly and connected parts, removed from the machine.

Figures 7 and 8 are cross sectional views taken substantially on the lines 7—7 and 8—8 respectively of Figure 4 and looking in the direction of the arrows.

Figure 9 is an enlarged diametrical cross section of a part of the automatic overcontrolling means.

As best shown in Figure 1, the machine in which my improved power supplying and transmitting mechanism is shown as illustratively incorporated, comprises a frame 11 carried by a support 12 (which is only fragmentarily shown). The frame carries a tub 21 provided with a cover 22, while centrally into the bottom of the tub projects a drive shaft 25, having a splined upper extremity to which various washing devices and other accessory apparatus may be coupled. In order that the range of use of the machine may be as wide as possible, it is desirable that such shaft be rotatable at different speeds, and that it also be rockable about its longitudinal axis, inasmuch as accessory apparatus which should be driven in these different ways, may of course be attached to the shaft. It will also be understood that such accessory devices may be of different sizes and weights, and that it might for example be dangerous or highly undesirable to attempt to drive at high speed an accessory too heavy or unstable, or for some other reason designed only to be driven or rocked at relatively low speed.

The source of power is shown as comprising an electric motor 75, which may be assumed to be intended to operate at substantially constant speed. The transmission, the casing of which is designated 77, is interposed between the motor and power shaft 25. Directly mounted upon the opposite end of the transmission casing is a pump 22 for ejecting water from the tub 21. The motor shaft is directly coupled to the transmission driving shaft 79, and the latter carries within the casing 77 a worm 80 meshing with a gear 81 loose on shaft 25, but adapted to be clutched thereto to drive the same by means of a sliding dog clutch 82 controllable by a shifter fork 83. This constitutes the direct or high speed drive. Turning as a unit with the gear 81 is a gear 85 meshing with a gear 87 fast on countershaft 89. The other end of the countershaft rigidly carries a smaller gear 90 meshing with the gear 91 also loose upon the shaft 25 and securable thereto by the same slidable clutching element 82, when the latter is thrown to another (upper) position. This clutching element will also be seen to be so arranged that it may occupy a neutral intermediate position in which both of the gears 81—91 are free. Another gear 94, also loose upon shaft 25, may be secured thereto by a separate clutching element 92 controllable by separate shifter fork 93. Means including a crank 97 and a Dutch yoke 98 drivable thereby (Fig. 8) is provided for constantly oscillating gear 94, the yoke being carried by and so driving a rack 96 meshing with the gear, while the crank 97 is driven by a gear 99 drivable by a worm as 100 mounted on shaft 79. The actuating means for the shifter forks 83—93 includes a hand lever 95, and the connecting mechanism (unshown) between such handle and the shifter forks, is such that fork 93 may be moved to couple gear 94 to the shaft 25, only when clutch element 82 is in neutral position. By virtue of this arrangement it will be seen to be possible to drive the shaft 25 either at high or low speed or to oscillate the same.

It is intended that when relatively heavy apparatus, such as clothes-washing means or the like, is connected to the shaft 25, the latter shall be driven only by the oscillating or rocking means, which rocks the shaft relatively slowly. It is particularly undesirable, because of the mass of such washing parts, which might consist, for example, of an inner tub as 33 (Fig. 7), filled with water, or the like, that the high speed drive be instituted, because of the undue strain upon the parts which would thus be occasioned. In order to prevent moving the shifter clutch 82 in a manner which could connect the high speed gear 81, or in the illustrated instance, any gearing arrangement but the oscillating drive, when such apparatus is connected to the shaft 25, I provide means for locking the clutch element 82 in neutral position. For this purpose the clutch element 82 is interiorly slotted as at 101, and a locking pin 103 is radially slidable in the shaft 25 from a retracted position in which it offers no interference with sliding movement of the clutch element along the shaft, to a projected position of engagement with the slot 101, as shown in Figure 7, in which it locks such clutch element in neutral position. The pin is normally retracted by means of a spring 104, while a camming portion 106 carried by the interiorly disposed head of the pin 103, is actuable by a rod 107 axially slidable in the shaft 25. Rod 106 is provided with an angular face at its bottom which serves as an actuating cam for the pin 103, as best shown in Figure 9. The rod is normally held in a raised position in which its top lies flush with the top of shaft 25 and locking pin 103 is retracted and inoperative, by a spring 108 trapped beneath the rod in the bore in which the same is slidable. The coupling element 43 for the washing apparatus, which is arranged to fit over the splined top 30 of the shaft 25 as above described, is provided with a centrally depending plunger portion 110 which, when the coupling portion is applied, pushes down the rod 107 to force the pin 103 outward into locking engagement with the groove 101 in the clutch element, if such movement of the pin is possible. If such movement of the pin is impossible because the clutch element is not in neutral position, this will be seen to prevent depression of the rod 107. In such event, the plunger portion 110 being longer than the interfitting splined portions of the shaft 25 and coupling element 43, the attachment of the washing apparatus is impossible because the splined parts through which alone driving engagement can be established, are held apart by the plunger. Once the clutch element 82 has been moved to neutral position, however, the plunger is free to move down, allowing the splined parts to be interfitted, and the washing parts to be operatively attached. When these are so applied, as will be apparent, the only shifting which may be effected, is the engagement and disengagement of the oscillating mechanism by movement of clutch member 92, clutch element 82 being then held against movement.

The motor 75 and transmission casing 77 are preferably assembled in unit form, the motor being carried in a frame 120 secured to the transmission casing as by a bolted flange 121 and adapted to serve as a supporting cradle for the motor, which is hung therein in such manner as to be rockable to cushion its power application. The direct support may be furnished by soft rubber blocks enclosed and supported in hollow boss portions as 123 and concentrically encircling the end bells of the motor, the rubber being bonded to both the motor and support bosses, so that the motor may rock axially to cushion the application of torque thereby. The entire unit comprising motor and transmission is also preferably hung in soft rubber supports which prevent the transmission of noise to the tub and framework, the supporting rubber blocks 125 are clamped by brackets 126 carried by the frame 120 and transmission casing, and by cooperating spaced brackets 127 adapted to be secured to the underside of the sub-base 128 of the machine.

What I claim is:

1. In a device of the character described, in combination with a source of power, a speed converting transmission adapted to transmit variant drives from said power source to elements imposing variant loads thereupon, a driven shaft, coupling means for connecting different drivable elements to said driven shaft, shiftable means incorporated in said transmission for changing the drive imparted to the driven shaft, means including a movable member appurtenant said coupling portion and operatively connected to said shiftable means and actuable by attachment of different elements to said driven shaft to control the effective operation of said shiftable means.

2. In a device of the character described, in combination with a source of power, a speed converting transmission adapted to transmit variant drives to different drivable elements, a driven shaft having a coupling portion to which such drivable elements are adapted to be attached, shiftable means incorporated in said transmission for changing the speed converting effect thereof, and means exposed appurtenant said coupling portion and extending through said shaft into operative connection with said shiftable means whereby the latter may be controlled by the attachment of drivable elements to said coupling portion.

3. In a device of the character described, in combination with a source of power, a speed converting transmission adapted to transmit variant drives to different drivable elements, a driven shaft having a coupling portion to which such drivable elements are adapted to be attached, main controlling means incorporated in said transmission movable to different positions to change the speed converting effect thereof, supplementary controlling means having a portion exposed appurtenant said coupling portion and extending through at least a portion of said shaft, locking means operatively connected to and controllable jointly by said main controlling means and said supplementary controlling means, and preventing undesired operation of one when the other is in predetermined position, the supplementary controlling member being actuable by connection of a drivable device of specific form to the coupling portion, and by engagement of said device with said appurtenant portion of the supplementary controlling means.

4. In a device of the character described, in combination with a source of power, a speed converting transmission adapted to transmit variant drives to different drivable elements, a driven shaft having a coupling portion to which such drivable elements are adapted to be attached, main controlling means incorporated in said transmission movable to different positions to change the speed converting effect thereof, supplementary controlling means having a portion exposed appurtenant said coupling portion and extending through at least a portion of said shaft, interlocking means operatively connected to and controllable jointly by said main controlling means and said supplementary controlling means, said interlocking means preventing movement of one of said controlling means when the other is in a predetermined position, or vice versa.

5. Apparatus as set forth in claim 2 including separate deliberately operable controlling means for said shiftable means.

6. Connecting and torque converting means for selective mechanical actuation of different drivable devices, comprising in combination with a source of power, a transmission adapted to transmit variant drives from said power source whereby such drivable devices may be actuated differently, a driven shaft, coupling means for connecting to said shaft different ones of said drivable devices, said transmission incorporating speed converting means, main controlling means for changing the speed converting effect of said last named means, and means including a movable member appurtenant said coupling means and operatively connected to said transmission to over-control the operative action of said main controlling means in response to connection of desired elements to said coupling means.

7. Connecting and torque converting means for selective mechanical actuation of different drivable devices, comprising in combination with a source of power, a transmission adapted to transmit variant drives from said source of power, whereby such drivable devices may be actuated differently, a driven shaft, coupling means for connecting to said shaft different ones of said drivable devices, said transmission incorporating speed converting means, main controlling means movable to different positions to change the speed converting effect of said last named means, and means comprising a blocking member appurtenant said coupling means, movable to and from a position to block the connection of desired devices to said transmission by said coupling means, said blocking member being connected to said transmission and operative by shifting of said transmission to a predetermined speed ratio by said main controlling means to block connection of desired drivable devices to said coupling means.

GEORGE K. PARSONS.